United States Patent [19]

Anzai et al.

[11] Patent Number: 4,585,698
[45] Date of Patent: Apr. 29, 1986

[54] METHOD OF COATING FIXED RESISTORS WITH A ONE-COMPONENT EPOXY RESIN COATING MATERIAL AND FIXED RESISTORS COATED WITH SAID ONE-COMPONENT EPOXY RESIN COATING MATERIAL

[75] Inventors: Kenji Anzai, Kobe; Tatsuo Hamabe, Osaka; Ichiro Watanabe, Nishinomiya; Yoshiaki Naganuma, Amagasaki, all of Japan

[73] Assignee: Ciba-Geigy Corporation, Ardsley, N.Y.

[21] Appl. No.: 669,704

[22] Filed: Nov. 9, 1984

[30] Foreign Application Priority Data

Nov. 17, 1983 [GB] United Kingdom ................ 8330649

[51] Int. Cl.⁴ ............................................. B32B 27/38
[52] U.S. Cl. .................................... 428/413; 427/101; 427/103; 427/113; 427/387; 524/466
[58] Field of Search ............... 427/101, 103, 113, 387; 524/466; 428/413

[56] References Cited

U.S. PATENT DOCUMENTS 2,847,395  8/1958  Wear .................................. 428/415
3,087,910  4/1963  Wear .................................. 528/118
3,294,748 12/1966  Rogers et al. .
4,122,211 10/1978  Kikuga et al. ..................... 427/103
4,268,656  5/1981  Ray-Chaudhuri et al. .

FOREIGN PATENT DOCUMENTS 1218937  1/1971  United Kingdom .

OTHER PUBLICATIONS

Chemical Abstracts, 98, 73347b (1983).
Chemical Abstracts, 98, 73346a (1983).
Chemical Abstracts 98, 90477 (1983).
Chemical Abstracts 101, 92236m (1984).
Lee et al.; Handbook of Epoxy Resins; McGraw-Hill Book Co.; 1967; pp. 14-4, 14-5.

Primary Examiner—Lewis T. Jacobs
Attorney, Agent, or Firm—Luther A. R. Hall

[57] ABSTRACT

One-component epoxy resin coating materials comprising
(A) an epoxy resin or a mixture of epoxy resins,
(B) as hardener for the epoxy resin at least one aromatic dicarboxylic acid dihydrazide or a triazine compound of the formula I

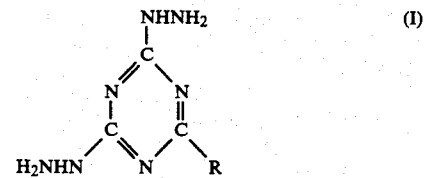

(R=alkylamino or dialkylamino having 1 or 2 carbon atoms in the alkyl moieties, phenylamino or hydrazino) and
(C) an anti-sagging agent or an inorganic filler or a mixture of anti-sagging agent and an inorganic filler, are used for the coating of fixed resistors. The resultant coatings exhibit good heat, moisture and cracking resistance.

6 Claims, No Drawings

METHOD OF COATING FIXED RESISTORS WITH A ONE-COMPONENT EPOXY RESIN COATING MATERIAL AND FIXED RESISTORS COATED WITH SAID ONE-COMPONENT EPOXY RESIN COATING MATERIAL

The present invention relates to a method of coating fixed resistors with certain one-component epoxy resin coating materials and the fixed resistors coated with said one-component epoxy resin coating material.

Good electrical, mechanical and thermal properties, especially good heat resistance, low water absorption and good resistance to cracking and in the pressure cooker test are pre-requisites for coatings on electronic parts. It is known that electrical insulating coating materials comprising epoxy resin systems, because of their good electrical, mechanical and thermal properties, are suitable for providing insulating and protective coatings on electronic parts such as fixed carbon film resistors and fixed metal film resistors. Known two-component systems for insulating purposes comprise an epoxy resin as the main resin component and an aromatic amine or acid anhydride as the main hardener component. In these known compositions the amounts of epoxy resin and hardener to be used are extremely critical, and the resin and hardener have to be mixed thoroughly in order to obtain homogeneous mixtures suitable for producing, e.g., coatings on fixed resistors. Usually, one or more coatings are applied and cured for about 10 minutes at a temperature from 160° to 180° C.

The aromatic amine hardener or acid anhydride hardener of these two-component systems begins to react gradually even at room temperature when admixed with the epoxy resin, and the viscosity of the mixture generally increases within a few hours to more than double the initial viscosity. Therefore, such two-component systems may become difficult to apply as coating materials.

As mentioned above, the pot life of such two-component systems is short (up to approximately 5–8 hours). Therefore, it may become necessary to weigh, mix and blend the resin and hardener component several times in a single day, and residues of the resin and hardener mixture must be removed daily from the mixing machines, dispensing equipment, storage containers and the like, which results in considerable loss of material.

In order to avoid the time-consuming and uneconomical operations of measuring, mixing and blending the resin and hardener component, as well as to eliminate an insufficient curing of the epoxy resin and unsatisfactory properties of the cured products due to mistakes in measuring or insufficient mixing and blending of the components, one-component epoxy resin coating materials having improved heat resistance, cracking and pressure cooker resistance (pressure cooker test, PCT) are needed.

In the past, dicyandiamide, imidazoles, boron trifluoride-amine complexes, dihydrazides of, e.g., dicarboxylic acids, and melamine have been used as latent hardeners in one-component epoxy resin compositions. However, in general, hardeners which have good storage stability in combination with epoxy resins, tend to have low reactivity and require high temperatures and long reaction times to obtain fully cured products. Hardeners of high reactivity which can be fully cured in about 10 minutes at temperatures in the range of from 160° to 180° C., on the other hand, exhibit short storage life. Some of the latent hardeners such as $BF_3$monoethylamine and the 2,4-diamino-6-(2-methylimidazolyl-1)ethyl-s-triazine isocyanurate adduct show high reactivity and good storage stability but their heat and PCT resistance is unsatisfactory. In order to obtain higher reactivity without impairing the storage stability at room temperature, accelerators have been added to one-component epoxy resin systems. A known one-component epoxy resin composition which comprises dicyandiamide as hardener and 3-(parachlorophenyl)-1,1-dimethylurea as accelerator exhibits good storage stability and high reactivity. It is, however, unsatisfactory with regard to heat and PCT resistance.

As mentioned above, dihydrazides of various dicarboxylic acids and heterocyclic di- or tri-hydrazides are well kown latent hardeners for epoxy resins; cp., e.g., U.S. Pat. Nos. 2,847,395, 3,087,910 and 4,268,656 and Japanese Kokai Nos. (published non-examined applications) Sho 57-137,317, Sho 57-137,318 and Sho 57-145,121. Among the dihydrazides of unsubstituted aliphatic dicarboxylic acids the following may be mentioned: the dihydrazide of succinic acid, adipic acid, sebacic acid, dodecanedioic acid and hexadecanedioic acid. Dihydrazides of aliphatic dicarboxylic acids may also be substituted by phenyl groups, such as the dihydrazide of N-phenylimino-propanedioic acid, and the dihydrazide of 7,9-diphenyl-hexadecanedioic acid. Examples of dihydrazides of aromatic dicarboxylic acids are the dihydrazide of isophthalic acid and the dihydrazide of hexahydroterephthalic acid. Among the hydrazides with heterocyclic rings 2,4-dihydrazino-6-methylamino-s-triazine and the trihydrazino-s-triazine may be mentioned. Dihydrazides of aliphatic dicarboxylic acids usually exhibit good storage stability but are of low reactivity. The resultant cured products are unsatisfactory with regard to heat and PCT resistance, and thus epoxy resin systems containing such unsubstituted aliphatic dihydrazides are unsuitable for producing protective coatings on electronic parts such as fixed resistors. Dihydrazides of aliphatic dicarboxylic acids substituted by phenyl groups show high reactivity but are unsatisfactory with regard to heat and PCT resistance.

It was found that selected dihydrazides, surprisingly, meet all the strict requirements for coating fixed resistors with regard to storage stability at room temperature and high reactivity at elevated temperatures of the resin/hardener mixture as well as heat, cracking, and PCT resistance of the cured products.

Therefore, the invention relates to a method of coating fixed resistors which is characterized in that a one-component epoxy resin coating material is applied to said fixed resistors, which coating material comprises (A) an epoxy resin or a mixture of epoxy resins having at least one epoxy group per molecule, (B) as a hardener for the epoxy resin at least one aromatic dicarboxylic acid dihydrazide or a triazine compound of the formula I

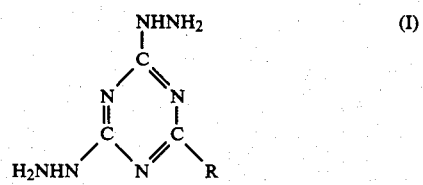

wherein R represents an alkylamino or dialkylamino group having 1 or 2 carbon atoms in the alkyl moieties, or a phenylamino or hydrazino group, or a mixture of an aromatic dicarboxylic acid dihydrazide and a triazine compound of the formula I, and (C) an anti-sagging agent or an inorganic filler, or a mixture of antisagging agent and an inorganic filler, and the coating thus obtained is cured by heating.

The invention also relates to the fixed resistors which are coated with a one-component epoxy resin coating material as defined above. Fixed resistors to be coated with the above-defined coating material may be of any conventional type, such as fixed carbon film resistors or fixed metal film resistors. The afore-said coating material may also be employed for coating high-frequency fixed inductors and for the dipping of hybrid integrated circuits.

Suitable epoxy resins (A) are those having, on average, more than one group of the formula II

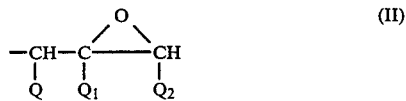

attached to a hetero atom, such as an S and especially an O or N atom. In formula II Q and $Q_2$ are each hydrogen and $Q_1$ is hydrogen or a methyl group, or Q and $Q_2$ together represent —$CH_2CH_2$— or —$CH_2CH_2CH_2$— and $Q_1$ is a hydrogen atom.

Examples of such resins are polyglycidyl and poly($\beta$-methylglycidyl) esters derived from aliphatic and especially from cycloaliphatic or aromatic polycarboxylic acids. Suitable polycarboxylic acids are, e.g. succinic acid, glutaric acid, adipic acid, pimelic acid, azelaic acid, sebacic acid, tetrahydrophthalic acid, 4-methyltetrahydrophthalic acid, hexahydrophthalic acid, 4-methylhexahydrophthalic acid, phthalic acid, iso- and terephthalic acid.

Also suitable are polyglycidyl and poly($\beta$-methylglycidyl) ethers which are obtained by reacting compounds having at least two alcoholic and/or phenolic hydroxyl groups per molecule with epichlorohydrin or with allyl chloride and subsequent epoxidizing with per acids. Suitable polyols are, e.g. ethylene glycol, diethylene glycol, poly(oxyethylene)glycols, propane-1,2-diol, poly(oxypropylene)glycols, propane-1,3-diol, butane-1,4-diol, pentane-1,5-diol, hexane-1,6-diol, hexane-2,4,6-triol, glycerine, 1,1,1-trimethylolpropane, pentaerythritol; bis-(4-hydroxycyclohexyl)methane, 2,2-bis(4-hydroxycyclohexyl)propane and 1,1-bis(hydroxymethyl)cyclohex-3-ene; resorcinol, hydroquinone, bis(4-hydroxyphenyl)methane (bisphenol F), 2,2-bis(4-hydroxyphenyl)propane (bisphenol A), 2,2-bis(4-hydroxy-3,5-dibromophenyl)propane (tetrabromo-bisphenol A), 1,1,2,2-tetrakis(4-hydroxyphenyl)ethane, 4,4'-dihydroxybiphenyl, bis(4-hydroxyphenyl)sulphone and novolacs obtained from formaldehyde or acetaldehyde and phenol, chlorophenol or alkylphenols having up to 9 carbon atoms in the alkyl portion, especially phenol and cresol novolacs.

Suitable poly(N-glycidyl) compounds can be obtained by dehydrochlorination of reaction products from epichlorohydrin and amines with at least to amine hydrogen atoms. Suitable amines are, e.g., aniline, n-butyl amine, bis(4-aminophenyl)methane, 1,3- and 1,4-xylylenediamine, 1,3-and 1,4-bis(aminomethyl)cyclohexane. Triglycidyl isocyanurate, N,N'-diglycidyl derivatives of cyclic alkylene ureas such as ethylene urea and 1,3-propylene urea, or hydantoins such as 5,5-dimethylhydantoin, may also be used. Di-S-glycidyl derivatives of dithiols such as ethane-1,2-dithiol and bis-(4-mercaptomethylphenyl)ether, are mentioned as poly(S-glycidyl) compounds.

The coating material of the invention preferably comprises as component (A) one or more bisphenol A type epoxy resins, bisphenol F type epoxy resins, cycloaliphatic epoxy resins or novolac type epoxy resins, or a mixture of such epoxy resins, the average molecular weight of said epoxy resins being less than 500. Especially preferred are optionally advanced diglycidyl ethers of 2,2-bis(4-hydroxyphenyl)propane, 2.2-bis(3,5-dibromo-4-hydroxyphenyl)propane, bis(4-hydroxyphenyl)methane, bis(4-hydroxycyclohexyl)methane, 2,2-bis(4-hydroxycyclohexyl)propane and polyglycidyl ethers of novolacs. Most particularly preferred are optionally advanced diglycidyl ethers of bisphenol A, tetrabromo-bisphenol A or bisphenol F, polyglycidyl ethers of phenol-formaldehyde and cresolformaldehyde novolacs and mixtures thereof.

Suitable compounds of formula I are 2,4-dihydrazino-6-methylamino-, -6-ethylamino-, -6-diethylamino-, -6-phenylamino-s-triazine and 2,4,6-tris-hydrazino-s-triazine.

The hardener (B) is preferably 2,4-dihydrazino-6-methylamino-s-triazine or the dihydrazide of isophthalic acid, or a mixture of these compounds. The dihydrazide of isophthalic acid is particularly preferred since it yields resin/hardener mixtures of good storage stability at room temperature and high reactivity at elevated temperatures as well as cured products having excellent heat and PCT resistance.

Any known anti-sagging agents and inorganic fillers may be used as component (C). Aerosil and bentone are preferred as anti-sagging agents. Suitable inorganic fillers are especially talcum, calcium carbonate, barium carbonate, mica, silica, aluminium dioxide, hydrated alumina, barium sulfate and titanium dioxide. Each of these anti-sagging agents and inorganic fillers may be used alone or in admixture.

The hardener (B) is preferably used in an amount of from 10 to 35 parts by weight (pbw), especially 15 to 30 pbw, calculated on 100 pbw of component (A). The anti-sagging agent is preferably employed in an amount of from 3 to 8 pbw, calculated on 100 pbw of component (A), while the inorganic filler is preferably used in an amount of from 20 to 60 pbw, calculated on 100 pbw of component (A).

The coating material may comprise further conventional additives, e.g. organic or inorganic flame retardants such as decabromodiphenyl oxide or brominated epoxy resins, more particularly the afore-mentioned tetrabromo-bisphenol A, and antimony trioxide, pigments, coupling agents, debubbling agents, and the like.

In order to improve the processability of the coating materials as defined and thereby decrease their viscosity, reactive diluents may be added to the epoxy resins (A), such as phenyl and cresyl glycidyl ether, butanediol diglycidyl ether, hexahydrophthalic acid diglycidyl ether or glycidyl esters of synthetic highly branched and mainly tertiary aliphatic monocarboxylic acids, known under the trade name "CORDURA E". Further suitable additives are plasticisers such as dibutylphthalate, and organic solvents.

In addition, in order to accelerate the curing reaction, i.e. to lower the curing temperature or to reduce the curing time, curing accelerators may be added to the epoxy resin (A) as occasion demands.

As accelerators, imidazoles, boron trifluoride amine complexes, sodium alcoholates, salts of organic metals, carboxylic acids, dicyandiamide, tertiary amines and Monuron [N-(4-chlorophenyl)-N',N'-dimethylurea] and the like are generally known. However, as accelerators for one-component epoxy resin coating materials for fixed resistors, which do not impair the storage stability, heat, cracking and PCT resistance, imidazoles are especially preferred.

The coating materials according to the invention usually can be cured in about 10 minutes at temperatures from about 160° to 180° C. The one-component coating materials of this invention can be prepared by methods well known per se, such as kneading, mixing and milling the various components by means of conventional devices such as kneaders and three-roller mills, and the like.

The invention is further illustrated by the following non-limiting examples.

EXAMPLE 1

100 pbw of ARALDITE GY 260 (a bisphenol A type epoxy resin having an epoxy equivalent weight of 180 to 200 g/equivalent and a viscosity of 12 000 to 16 000 mPas at 25° C.), 25.7 pbw of isophthalic acid dihydrazide (Japan Hydrazine Company, Inc.), 4 pbw of Aerosil RY 200 (Nippon Aerosil Co., Ltd.), 10 pbw of titanium dioxide R 820 (Ishihara Sangyo Co., Ltd.), and 20 pbw of talcum MS (Nippon Talc Co., Ltd.) are first mixed in a kneader, then milled and thoroughly mixed by passing the mixture twice through a three-roller mill. Thereby, a one-component epoxy resin coating material is obtained. The coating material is applied to fixed resistors (fixed carbon film resistor elements) and cured at 180° C. for 10 minutes. The storage stability and the properties of the cured coating film are tested as follows:

(a) Moisture resistance test (pressure cooker test): The coating material is applied to fixed carbon film resistor elements with a rating of 1 MΩ/1/4 W. After curing, the resistors are put into a pressure cooker testing apparatus (Type TC-242 of Hirayama Manufacturing Co., Ltd) and a voltage stress of 300 V direct current is applied continuously for 16 hours without a break, at 120° C. and 2.1 bar. The initial resistance and the resistance after testing as described are measured by a digital multimeter (type TR-6841 of Takeda Riken Co., Ltd.). The difference between the resistance values before and after testing is calculated and expressed in percentages of the initial resistance value. This test is a measure for the degree of corrosion.

(b) Off-and-on electrical overloading test: The coating material is applied to the fixed carbon film resistor elements with a rating of 1 KΩ/1/4 W. After curing, a voltage stress of 63.2 V alternating current (four times higher than that of the rated voltage) is applied to the resistor for 1 second followed by a 25-second pause without electrical stress. Thereby, the temperature of the resistor surface rises to extremely high temperatures (more than 200° C.) when the electricity is switched on, and decreases rapidly to temperatures below 50° C. when the electricity is switchend off. This test cycle is repeated up to 10 000 cycles. Thereafter, the appearance of the coated film, especially with regard to the presence of cracks, is examined by the naked eye and through a stereo-microscope.

(c) Heat resistance: The glass transition temperature (Tg) of the cured material is measured with a differential thermal analysis apparatus (Mettler TA 2 000).

(d) Storage stability: The time required for the viscosity of the one-component epoxy resin coating material kept at 25° C. to become double, based on the initial value, is determined (by means of a B-type viscometer of Tokyo Keiki Ltd., Japan).

EXAMPLE 2

100 pbw of ARALDITE GY 260, 22.4 pbw of 2,4-dihydrazino6-methylamino-s-triazine (Japane Hydrazine Company, Ltd.), 4 pbw of Aerosil RY 200, 10 pbw of titanium dioxide R 820 and 20 pbw of talcum MS are thoroughly mixed in a kneader and a three-roller mill as described in Example 1. A one-component epoxy resin coating material is obtained. This coating material is applied to fixed resistors and cured at 180° C. for 10 minutes. The storage stability and the properties of the cured coating film are tested in the same manner as described in Example 1. The results are summarized below:

|  | Coating material according to | |
|---|---|---|
|  | Example 1 | Example 2 |
| (a) moisture resistance test,* difference in resistance (%) | 3.0 | 4.0 |
| (b) off-and-on electrical overloading test appearance: colour change | no change | no change |
| cracking | no cracking | no cracking |
| (c) heat resistance Tg (°C.) | 177 | 170 |
| (d) storage stability (25° C.) | 3 months | 3 months. |

*Genereally, less than 5% are preferred for difference in resistance according to the test method described in Example 1.

The above results show that the coating materials according to the invention have good storage stability, high reactivity at elevated temperatures, and yield coatings having good heat, moisture (PCT) and cracking resistance.

What is claimed is:

1. A method of coating a fixed resistor, characterized in that a one-component epoxy resin coating material is applied to said fixed resistor which coating material comprises (A) an epoxy resin or a mixture of epoxy resins having at least one epoxy group per molecule, (B) as a hardener for the epoxy resin at least one aromatic dicarboxylic acid dihydrazide or a triazine compound of the formula I

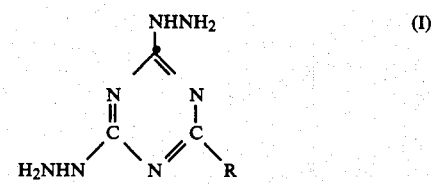

wherein R represents an alkylamino or dialkylamino group having 1 or 2 carbon atoms in the alkyl moieties, or a phenylamino or hydrazino group, or a mixture of an aromatic dicarboxylic acid dihydrazide and a triazine compound of the formula I, and (C) an anti-sagging agent or an inorganic filler or a mixture of anti-sagging agent and an inorganic filler, and the coating thus obtained is cured by heating.

2. A method as claimed in claim 1, wherein the coating material comprises as component (A) one or more bisphenol A type epoxy resins, bisphenol F type epoxy resins, cycloaliphatic epoxy resins or novolac type epoxy resins. or a mixture of such epoxy resins, the average molecular weight of said epoxy resins being less than 500.

3. A method as claimed in claim 1, wherein the coating material comprises as component (B) the dihydrazide of isophthalic acid, 2,4-dihydrazino-6-methylamino-s-triazine or a mixture of these compounds.

4. A method as claimed in claim 1, wherein the coating material comprises as anti-sagging agent aerosil or bentone and as inorganic filler talcum, calcium carbonate, barium carbonate, mica, silica, aluminium dioxide, hydrated alumina, barium sulfate or titanium dioxide, or a mixture of said anti-sagging agents or inorganic fillers.

5. A method as claimed in claim 1, wherein the coating material comprises from 10 to 35 parts by weight of component (B), from 3 to 8 parts by weight of anti-sagging agent, and from 20 to 60 parts by weight of an inorganic filler, calculated on 100 parts by weight of component (A).

6. A coated fixed resistor, wherein the coating material comprises the cured product of
(A) an epoxy resin or a mixture of epoxy resins having at least one epoxy group per molecule,
(B) as a hardener for the epoxy resin at least one aromatic dicarboxylic acid dihydrazide or a triazine compound of the formula I

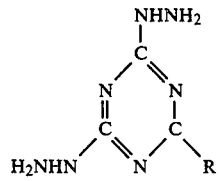

wherein R represents an alkylamino or dialkylamino group having 1 or 2 carbon atoms in the alkyl moieties, or a phenylamino or hydrazino group, or a mixture of an aromatic dicarboxylic acid dihydrazide and a triazine compound of the formula I, and
(C) an anti-sagging agent or aninorganic filler or a mixture of anti-sagging agent and an inorganic filler.

* * * * *